& 
United States Patent
Takita et al.

(10) Patent No.: US 8,026,005 B2
(45) Date of Patent: Sep. 27, 2011

(54) MICROPOROUS POLYOLEFIN MEMBRANE, ITS PRODUCTION METHOD, BATTERY SEPARATOR, AND BATTERY

(75) Inventors: Kotaro Takita, Tochigi-ken (JP); Shintaro Kikuchi, Saitama-ken (JP)

(73) Assignee: Tonen Chemical Corporation, Tokyo (JP)

(*) Notice: Subject to any disclaimer, the term of this patent is extended or adjusted under 35 U.S.C. 154(b) by 39 days.

(21) Appl. No.: 12/296,338

(22) PCT Filed: Apr. 9, 2007

(86) PCT No.: PCT/JP2007/058215
§ 371 (c)(1),
(2), (4) Date: Jan. 14, 2009

(87) PCT Pub. No.: WO2007/117042
PCT Pub. Date: Oct. 18, 2007

(65) Prior Publication Data
US 2009/0286161 A1    Nov. 19, 2009

(30) Foreign Application Priority Data
Apr. 7, 2006   (JP) ................. 2006-106175

(51) Int. Cl.
*H01M 2/16*      (2006.01)
(52) U.S. Cl. ................................................. 429/247
(58) Field of Classification Search .............. 429/145, 429/144, 247
See application file for complete search history.

(56) References Cited

U.S. PATENT DOCUMENTS
2005/0098913 A1*  5/2005  Funaoka et al. ............ 264/41

FOREIGN PATENT DOCUMENTS

| JP | 06-240036 A | 8/1994 |
| JP | 09-012756 A | 1/1997 |
| JP | 2000-260413 A | 9/2000 |
| JP | 2003-105121 A | 4/2003 |
| WO | 99/48959 A1 | 9/1999 |
| WO | 00/20492 A1 | 4/2000 |
| WO | 02/072248 A1 | 9/2002 |
| WO | 2005/113657 A1 | 12/2005 |

* cited by examiner

*Primary Examiner* — Christina Johnson
*Assistant Examiner* — Larry Thrower
(74) *Attorney, Agent, or Firm* — Sughrue Mion, PLLC (57) ABSTRACT

A microporous polyolefin membrane having a structure in which its pore size distribution curve obtained by mercury intrusion porosimetry has at least two peaks, which is produced by (1) extruding a melt-blend of (a) (i) a polyethylene resin containing 7% or less by mass of ultra-high-molecular-weight polyethylene having a weight-average molecular weight of $1 \times 10^6$ or more, or (ii) a mixture of 75% by mass or more of said polyethylene resin and 25% or less by mass of polypropylene, and (b) a membrane-forming solvent, (2) stretching a gel-like sheet obtained by cooling an extrudate, (3) washing it, (4) stretching the resultant microporous membrane to 1.1-1.8 fold in at least one direction, and (5) heat-setting it at a temperature in a range of the stretching temperature of the microporous membrane plus or minus 5 degrees centigrade.

5 Claims, 2 Drawing Sheets

MICROPOROUS POLYOLEFIN MEMBRANE, ITS PRODUCTION METHOD, BATTERY SEPARATOR, AND BATTERY

CROSS REFERENCE TO RELATED APPLICATION

This application is a National Stage of International Application No. PCT/JP2007/058215 filed Apr. 9, 2007, claiming priority based on Japanese Patent Application No. 2006-106175, filed Apr. 7, 2006, the contents of all of which are incorporated herein by reference in their entirety.

FIELD OF THE INVENTION

The present invention relates to a microporous polyolefin membrane having suitable permeability, mechanical strength, heat shrinkage resistance, compression resistance and electrolytic solution absorption, a method for producing such a microporous polyolefin membrane, a battery separator formed by such a microporous polyolefin membrane, and a battery comprising such a separator.

BACKGROUND OF THE INVENTION

Microporous polyolefin membranes are useful as separators for primary batteries and secondary batteries such as lithium ion secondary batteries, lithium-polymer secondary batteries, nickel-hydrogen secondary batteries, nickel-cadmium secondary batteries, nickel-zinc secondary batteries, silver-zinc secondary batteries, etc. When the microporous polyolefin membrane is used as a battery separator, particularly lithium ion battery separator, the membrane's performance significantly affects the battery's properties, productivity, and safety. Accordingly, the microporous polyolefin membrane should have appropriate permeability, mechanical properties, heat resistance, dimensional stability, shutdown properties, meltdown properties, etc. As is known, it is desirable for the batteries to have a relatively low shutdown temperature and a relatively high meltdown temperature for improved battery safety properties, particularly for batteries exposed to high temperatures during under operating conditions. High separator permeability is desirable for high capacity of batteries. A separator with high mechanical strength is desirable for improved battery assembly and fabrication properties.

The optimization of material compositions, stretching conditions, heat treatment conditions, etc., has been proposed to improve the properties of microporous polyolefin membranes used as battery separators. For example, JP6-240036A discloses a microporous polyolefin membrane having improved pore diameter and a sharp pore diameter distribution. The membrane is made from a polyethylene resin containing 1% or more by mass of ultra-high-molecular-weight polyethylene having a weight-average molecular weight ("Mw") of $7 \times 10^5$ or more, the polyethylene resin having a molecular weight distribution (weight-average molecular weight/number-average molecular weight) of 10-300, and the microporous polyolefin membrane having a porosity of 35-95%, an average penetrating pore diameter of 0.05-0.2 μm, a rupture strength (15-mm width) of 0.2 kg or more, and a pore diameter distribution (maximum pore diameter/average penetrating pore diameter) of 1.5 or less. This microporous membrane is produced by extruding a melt-blend of the above polyethylene resin and a membrane-forming solvent through a die, stretching a gel-like sheet obtained by cooling at a temperature from the crystal dispersion temperature ("Tcd") of the above polyethylene resin to the melting point ("Tm") +10° C., removing the membrane-forming solvent from the gel-like sheet, re-stretching the resultant membrane to 1.5-3 fold as an area magnification at a temperature of Tm of the above polyethylene resin −10° C. or less, and heat-setting it at a temperature from Tcd of the above polyethylene resin to Tm.

WO 1999/48959 discloses a microporous polyolefin membrane having suitable strength and permeability, as well as a uniformly porous surface without local permeability variations. The membrane is made of a polyolefin resin, for instance, high-density polyethylene, having Mw of 50,000 or more and less than 5,000,000, and a molecular weight distribution of 1 or more to less than 30, which has a network structure with fine gaps formed by uniformly dispersed micro-fibrils, having an average micro-fibril size of 20-100 nm and an average micro-fibril distance of 40-400 nm. This microporous membrane is produced by extruding a melt-blend of the above polyolefin resin and a membrane-forming solvent through a die, stretching a gel-like sheet obtained by cooling at a temperature of Tm of the above polyolefin resin −50° C. or higher and lower than Tm, removing the membrane-forming solvent from the gel-like sheet, re-stretching it to 1.1-5 fold at a temperature of Tm of the above polyolefin resin −50° C. or higher and lower than Tm, and heat-setting it at a temperature from Tcd of the above polyolefin resin to Tm.

WO 2000/20492 discloses a microporous polyolefin membrane of improved permeability which is characterized by fine polyethylene fibrils having Mw of $5 \times 10^5$ or more or a composition comprising such polyethylene. The microporous polyolefin membrane has an average pore diameter of 0.05-5 μm, and the percentage of lamellas at angles θ of 80-100° relative to a membrane surface is 40% or more in longitudinal and transverse cross sections. This polyethylene composition comprises 1-69% by weight of ultra-high-molecular-weight polyethylene having a weight-average molecular weight of $7 \times 10^5$ or more, 98-1% by weight of high-density polyethylene, and 1-30% by weight of low-density polyethylene. This microporous membrane is produced by extruding a melt-blend of the above polyethylene or its composition and a membrane-forming solvent through a die, stretching a gel-like sheet obtained by cooling, heat-setting it at a temperature from Tcd of the above polyethylene or its composition to (Tm +30° C.), and removing the membrane-forming solvent.

WO 2002/072248 discloses a microporous membrane having improved permeability, particle-blocking properties and strength. The membrane is made using a polyethylene resin having Mw of less than 380,000. The membrane has a porosity of 50-95%, an average pore diameter of 0.01-1 μm. The microporous membrane has a three-dimensional network skeleton formed by micro-fibrils having a average diameter of 0.2-1 μm connected to each other throughout the overall microporous membrane, and openings defined by the skeleton to have an average diameter of 0.1 μm or more and less than 3 μm. This microporous membrane is produced by extruding a melt-blend of the above polyethylene resin and a membrane-forming solvent through a die, removing the membrane-forming solvent from a gel-like sheet obtained by cooling, stretching it to 2-4 fold at a temperature of 20-140° C., and heat-treating the stretched membrane at a temperature of 80-140° C.

WO 2005/113657 discloses a microporous polyolefin membrane having suitable shutdown properties, meltdown properties, dimensional stability, and high-temperature strength. The membrane is made using a polyolefin composition comprising (a) a polyethylene resin containing 8-60% by mass of a component having a molecular weight of 10,000 or less, and an Mw/Mn ratio of 11-100, wherein Mn is the number-average molecular weight of the polyethylene resin, and a viscosity-average molecular weight ("Mv") of 100,000-1,000,000, and (b) polypropylene. The membrane has a porosity of 20-95%, and a heat shrinkage ratio of 10% or less at 100° C. This microporous polyolefin membrane is produced by extruding a melt-blend of the above polyolefin and a membrane-forming solvent through a die, stretching a gel-like sheet obtained by cooling, removing the membrane-forming solvent, and annealing the sheet.

With respect to the properties of separators, not only permeability, mechanical strength, dimensional stability, shutdown properties and meltdown properties, but also properties related to battery productivity such as electrolytic solution absorption, and battery cyclability, such as electrolytic solution retention properties, have recently been given importance. In particular, electrodes for lithium ion batteries expand and shrink according to the intrusion and departure of lithium, and an increase in battery capacity leads to larger expansion ratios. Because separators are compressed when the electrodes expand, it is desired that the separators when compressed suffer as little a decrease as possible in electrolytic solution retention.

Moreover, even though improved microporous membranes are disclosed in JP6-240036A, WO 1999/48959, WO 2000/20492, WO 2002/072248, and WO 2005/113657, further improvements are still needed particularly in membrane permeability, mechanical strength, heat shrinkage resistance, compression resistance, and electrolytic solution absorption properties. It is thus desired to form battery separators from microporous membranes having improved permeability, mechanical strength, heat shrinkage resistance, compression resistance and electrolytic solution absorption.

OBJECTS OF THE INVENTION

Accordingly, an object of the present invention is to provide a microporous polyolefin membrane having improved permeability, mechanical strength, heat shrinkage resistance, compression resistance and electrolytic solution absorption.

Another object of the present invention is to provide a method for producing such a microporous polyolefin membrane.

A further object of the present invention is to provide a battery separator formed by such a microporous polyolefin membrane.

A still further object of the present invention is to provide a battery comprising such a separator.

DISCLOSURE OF THE INVENTION

As a result of intense research in view of the above objects, the inventors have found that (A) a microporous polyolefin membrane formed to have a structure, in which a pore size (or pore diameter when the pores are approximately spherical) distribution curve obtained by mercury intrusion porosimetry has at least two peaks, has suitable permeability, mechanical strength, heat shrinkage resistance, compression resistance and electrolytic solution absorption, and (B) such a microporous polyolefin membrane can be obtained by extruding through a die a melt-blend comprising (a) (i) polyethylene resin containing 7% or less by mass of an ultra-high-molecular-weight polyethylene having a weight-average molecular weight of $1 \times 10^6$ or more, or (ii) a mixture of 75% by mass or more of said polyethylene resin and 25% or less by mass of polypropylene, and (b) a membrane-forming solvent, cooling the extrudate to make a gel-like sheet, stretching the cooled gel-like sheet, removing the membrane-forming solvent from the cooled gel-like sheet in order to form a microporous membrane, stretching the membrane at a stretching temperature to a magnification ranging from 1.1 to 1.8 fold in at least one direction to form a stretched membrane, and heat-setting the stretched membrane at a heat-setting temperature in a range of the stretching temperature of the membrane ±5° C. The present invention has been completed based on such findings.

Thus, the microporous polyolefin membrane of the present invention, whose pore size distribution curve obtained by mercury intrusion porosimetry has at least two peaks, the polyolefin comprising (1) a polyethylene resin containing 7% or less by mass of ultra-high-molecular-weight polyethylene having a weight-average molecular weight of $1 \times 10^6$ or more, or (2) a mixture of 75% by mass or more of the polyethylene resin and 25% or less by mass of polypropylene.

In an embodiment, the microporous polyolefin membrane has dense domains corresponding to a main peak in a range of 0.01 to 0.08 μm in the pore size (or pore diameter when the pores are approximately spherical) distribution curve, and coarse domains corresponding to at least one sub-peak in a range of more than 0.08 μm to 1.5 μm in the pore size (or pore diameter when the pores are approximately spherical) distribution curve. In an embodiment, the pore volume ratio of the dense domains to the coarse domains is 0.5 to 49. In an embodiment, the microporous polyolefin membrane has surface roughness of $3 \times 10^2$ nm or more as the maximum height difference between any two points on the surface of the membrane. In an embodiment, the upper limit on the surface roughness is $3 \times 10^3$ nm. With surface roughness within this range, the microporous polyolefin membrane has a large contact area with an electrolytic solution when used as a battery separator, exhibiting suitable electrolytic solution absorption characteristics.

In an embodiment, the polyethylene is obtained from a polyethylene resin, with the resin comprising a mixture of 7% or less by mass of an ultra-high-molecular-weight polyethylene and 93% by mass or more of a polyethylene having a lower molecular weight than that of the ultra-high-molecular-weight polyethylene. In another embodiment, the polyethylene resin comprises the polyethylene having a lower molecular weight (also called the "lower molecular weight polyethylene") without the ultra-high-molecular-weight polyethylene. In other words, in an embodiment the polyethylene resin consists essentially of the lower molecular weight polyethylene; in another embodiment, the polyethylene resin consists of the lower molecular weight polyethylene. The lower molecular weight polyethylene is preferably a high-density polyethylene having a weight-average molecular weight of $1 \times 10^4$ to $5 \times 10^5$.

The following are preferred embodiments of the present invention:

(1) The microporous polyolefin membrane may comprise 25% or less by mass of the polypropylene and 75% by mass or more of the ultra-high-molecular-weight polyethylene and the lower molecular weight polyethylene.

(2) In the microporous polyolefin membrane (1), (a) the ultra-high-molecular-weight polyethylene is one or more of ethylene homopolymer or ethylene•α-olefin copolymer; and (b) the lower molecular weight polyethylene has a weight-average molecular weight ranging from $1 \times 10^5$ to $5 \times 10^5$ and one or more of high-density polyethylene, medium-density polyethylene, branched low-density polyethylene, and linear low-density polyethylene.

(3) In the microporous polyolefin membrane (1), the Mw/Mn of the polyethylene resin ranges from 5 to 300.

(4) In the microporous polyolefin membrane (1), the membrane further comprises a third polymer selected from one or more of polybutene-1, polypentene-1, poly-4-methyl-pentene-1, polyhexene-1, polyoctene-1, polyvinyl acetate, polymethyl methacrylate, polystyrene, and ethylene•α-olefin copolymer.

(5) In the microporous polyolefin membrane (1), the microporous polyolefin membrane has an air permeability measured according to JIS P8117 ranging from 20 to 400 seconds/100 cm$^3$.

(6) In the microporous polyolefin membrane (1), the microporous polyolefin membrane has a porosity ranging from 25 to 80%.

(7) In the microporous polyolefin membrane (1), the microporous polyolefin membrane has a pin puncture strength of 2,000 mN or more at a membrane thickness of 20-μm.

(8) In the microporous polyolefin membrane (1), the microporous polyolefin membrane has a tensile rupture strength of 49,000 kPa or more.

(9) In the microporous polyolefin membrane (1), the microporous polyolefin membrane has a tensile rupture elongation of 100% or more.

(10) In the microporous polyolefin membrane (1), wherein the microporous polyolefin membrane has a heat shrinkage ratio of 12% or less.

(11) In the microporous polyolefin membrane (1), wherein the microporous polyolefin membrane has a thickness variation ratio of 20% or less after heat compression.

(12) In the microporous polyolefin membrane (1), wherein the microporous polyolefin membrane has an air permeability of 700 sec/100 cm$^3$ or less after heat compression at a 20-μm membrane thickness.

(13) In the microporous polyolefin membrane (1), wherein the microporous polyolefin membrane has an air permeability of 650 sec/100 cm$^3$ or less at a 20-μm membrane thickness.

(14) In the microporous polyolefin membrane (1), wherein the microporous polyolefin membrane has a surface roughness of $3 \times 10^2$ nm or more.

The method for producing a microporous polyolefin membrane according to the present invention comprises the steps of (1) melt-blending (a) (i) a polyethylene resin containing 7% or less by mass of ultra-high-molecular-weight polyethylene having a weight-average molecular weight of $1 \times 10^6$ or more based on the mass of the polyethylene resin or (ii) a mixture of 75% by mass or more of said polyethylene resin and 25% or less by mass of polypropylene, and (b) a membrane-forming solvent, in order to form a polyolefin solution, with the solution preferably having a solvent concentration of 25-50% by mass based on the mass of the polyolefin solution, (2) extruding the polyolefin solution through a die to form an extrudate, (3) cooling the extrudate to form a gel-like sheet, (4) stretching the gel-like sheet at a first stretching temperature in a range of the crystal dispersion temperature ("Tcd") of the polyethylene resin to (Tcd +25° C.), (5) removing the membrane-forming solvent from the stretched gel-like sheet to form a microporous membrane, (6) stretching the membrane to a magnification of 1.1 to 1.8 fold in at least one direction at a second stretching temperature to form a stretched microporous membrane, and (7) heat-setting the stretched microporous membrane in a range of the second stretching temperature ±5° C. in order to form the microporous polyolefin membrane.

In the above method, the stretching of the microporous polyolefin membrane in step (6) may be called "re-stretching," because it is conducted after the stretching of the gel-like sheet in step (4).

The following are preferred embodiments of the present invention:

(15) The method for making a microporous polyolefin membrane, wherein the heat-setting temperature may be in a range of the stretching temperature of the microporous membrane ±3° C.

(16) In the method (15), further comprising a heat-setting treatment step (8) between steps (4) and (5) wherein the stretched gel-like sheet is heat-set at a temperature ranging from the stretching temperature ±5° C.

(17) In the method (16), further comprising a heat roller treatment step (9) following step (8) and before step (5) wherein the stretched gel-like sheet contacts a heated roller at a temperature ranging from Tcd +10° C. to the melting point Tm.

(18) In the method (17), further comprising a hot solvent treatment step (10) following step (9) and before step (5) wherein the stretched gel-like sheet is contacted with a hot solvent.

(19) In the method (15), further comprising a heat-setting treatment step (11) conducted between the steps (5) and (6) wherein the microporous membrane is heat-set at a temperature ranging from the stretching temperature of the gel-like sheet ±5° C.

(20) In the method (15), further comprising a cross-linking step (12) following step (7) wherein the heat-set membrane is cross-linked by ionizing radiation rays selected from one or more of α-rays, β-rays, γ-rays, and electron beams.

(21) In the method (15), further comprising a hydrophilizing treatment step (13) following step (7) wherein the microporous membrane is made more hydrophilic by one or more of a monomer-grafting treatment, a surfactant treatment, and a corona-discharging treatment.

(22) In the method (15), further comprising a surface-coating treatment step (14) following step (7) wherein the heat-set microporous membrane is coated with one or more of a porous polypropylene, a porous fluororesin, a porous polyimide, and a porous polyphenylene sulfide.

(23) In the method (15), wherein the polyolefin composition comprises one of
(a) a mixture of the ultra-high-molecular-weight polyethylene and a lower molecular weight polyethylene having an Mw of less than that of the ultra-high-molecular-weight polyethylene;
(b) the lower molecular weight polyethylene; or
(c) (i) the mixture (a) or the lower molecular weight polyethylene, and (ii) 25% or less by mass of polypropylene resin based on the combined mass of the polyolefin composition.

(24) In the method (15), wherein the membrane-forming solvent is a liquid at room temperature.

(25) In the method (15), wherein the liquid solvent has a viscosity ranging from 30 to 500 cSt at a temperature of 25° C.

(26) In the method (15), wherein the melt-blending temperature of the polyolefin solution is preferably in a range of the melting point ("Tm") of the polyethylene resin +10° C. to Tm +120° C.

(27) In the method (15), wherein the concentration of the polyolefin composition in the polyolefin solution is preferably 25 to 50% by mass based on the mass of the polyolefin solution.

(28) In the method (15), wherein the extruding of step (2) is conducted at an extrusion temperature ranging from 140 to 250° C.

(29) In the method (15), wherein the cooling is conducted at least to a gelation temperature of the extrudate at a cooling rate of 50° C./minute or more.

(30) In the method (15), wherein the stretching of step (4) is at least one of monoaxially or biaxially.

(31) In the method (30), wherein the stretching of step (4) forms a three-dimensional network structure.

(32) In the method (15), wherein the solvent-removal step (5) is conducted using a washing solvent comprising one or more of saturated hydrocarbons, chlorinated hydrocarbons, ethers, ketones, linear fluorocarbons, cyclic hydrofluorocarbons, and perfluoroethers.

(33) In the method (15), wherein the stretching of step (6) is conducted at a stretching magnification of 1.2 to 1.6 fold.

The microporous polyolefin membrane of the present invention is preferably made by:

(1) preparing a polyolefin solution comprising (i) a polyethylene resin containing 7% or less by mass of ultra-high-molecular-weight polyethylene having a weight-average molecular weight of $1 \times 10^6$ or more, or (ii) a mixture of 75% by mass or more of said polyethylene resin and 25% or less by mass of polypropylene, and (iii) a membrane-forming solvent, (2) extruding the polyolefin solution through a die to form an extrudate, (3) cooling the extrudate to form a gel-like sheet, (4) stretching the gel-like sheet at a stretching temperature ranging from the polyethylene resin's crystal dispersion temperature Tcd to (Tcd +25° C.) to form a stretched gel-like sheet, (5) removing the membrane-forming solvent from the stretched gel-like sheet to form a microporous membrane, (6) stretching the microporous membrane to a magnification of 1.1 to 1.8 fold in at least one direction to form a stretched microporous membrane, and (7) heat-setting the stretched microporous membrane in the range of the stretching temperature of the microporous membrane ±5° C. to form the microporous polyolefin membrane.

The battery separator according to the present invention, which is made by a microporous polyolefin membrane, whose pore size distribution curve obtained by mercury intrusion porosimetry has at least two peaks, the polyolefin comprising (1) a polyethylene resin containing 7% or less by mass of ultra-high-molecular-weight polyethylene having a weight-average molecular weight of $1 \times 10^6$ or more, or (2) a mixture of 75% by mass or more of the polyethylene resin and 25% or less by mass of polypropylene.

In the battery separator, wherein (a) the ultra-high-molecular-weight polyethylene is preferably one or more of ethylene homopolymer or ethylene•α-olefin copolymer; and (b) the lower molecular weight polyethylene preferably has a weight-average molecular weight ranging from $1 \times 10^5$ to $5 \times 10^5$ and one or more of high-density polyethylene, medium-density polyethylene, branched low-density polyethylene, and linear low-density polyethylene. The Mw/Mn of the polyethylene resin preferably ranges from 5 to 300. The membrane further may comprise a third polymer selected from one or more of polybutene-1, polypentene-1, poly-4-methylpentene-1, polyhexene-1, polyoctene-1, polyvinyl acetate, polymethyl methacrylate, polystyrene, and ethylene•α-olefin copolymer.

The battery according to the present invention comprising an electrolyte, an anode, a cathode, and a separator situated between the anode and the cathode, wherein the separator is made by a microporous polyolefin membrane, whose pore size distribution curve obtained by mercury intrusion porosimetry has at least two peaks, the polyolefin comprising (1) a polyethylene resin containing 7% or less by mass of ultra-high-molecular-weight polyethylene having a weight-average molecular weight of $1 \times 10^6$ or more, or (2) a mixture of 75% by mass or more of the polyethylene resin and 25% or less by mass of polypropylene.

The battery may be a lithium ion secondary battery, a lithium-polymer secondary battery, a nickel-hydrogen secondary battery, a nickel-a cadmium secondary battery, a nickel-zinc secondary battery, or a silver-zinc secondary battery. The cathode preferably comprise a current collector, and a cathodic active material layer on the current collector capable of absorbing and discharging lithium ions. The electrolyte preferably comprise lithium salts in an organic solvent.

DETAILED DESCRIPTION OF THE INVENTION

[1] Composition of Microporous Polyolefin Membrane
(1) Polyolefin Composition

In an embodiment, the polyolefin composition comprises (a) a polyethylene resin, which contains a polyethylene composition comprising ultra-high-molecular-weight polyethylene having a weight-average molecular weight "Mw" of $1 \times 10^6$ or more and a polyethylene having a Mw less than that of the ultra-high molecular weight polyethylene; the percentage of the ultra-high-molecular-weight polyethylene in the polyethylene composition being 7% or less by mass based on the mass of the polyethylene composition. Alternatively, the polyethylene composition comprises the polyethylene having a lower molecular weight (also called the "lower molecular weight polyethylene") without the ultra-high-molecular-weight polyethylene. In another embodiment, the polyolefin composition comprises (b) a combination of the polyethylene resin and 25% or less by mass of a polypropylene resin based on the total mass of the polyethylene resin and polypropylene resin.

(a) Polyethylene Resin
(i) Composition

The ultra-high-molecular-weight polyethylene in the polyethylene resin has Mw of $1 \times 10^6$ or more. The ultra-high-molecular-weight polyethylene can be an ethylene homopolymer, or an ethylene·α-olefin copolymer containing a small amount (~5% by mol) of a third α-olefin. The third α-olefin, which is not ethylene, is preferably propylene, butene-1, pentene-1, hexene-1,4-methylpentene-1, octene-1, vinyl acetate, methyl methacrylate, or styrene and combinations thereof. The Mw of the ultra-high-molecular-weight polyethylene is preferably $1 \times 10^6$ to $15 \times 10^6$, more preferably $1 \times 10^6$ to $5 \times 10^6$, and most preferably $1 \times 10^6$ to $3 \times 10^6$.

The lower molecular weight polyethylene is preferably at least one of high-density polyethylene, medium-density polyethylene, branched low-density polyethylene, and linear low-density polyethylene, and its Mw is preferably $1\times10^4$ to $5\times10^5$. More preferably, the lower molecular weight polyethylene is a high-density polyethylene, and its Mw is preferably $1\times10^5$ to $5\times10^5$, more preferably $2\times10^5$ to $4\times10^5$. The lower molecular weight polyethylene can be an ethylene homopolymer, or a copolymer containing a small amount (~5% by mol) of the third α-olefin such as propylene, butene-1, hexene-1, etc. and mixtures thereof. Such copolymer is preferably produced using a single-site catalyst.

Polyethylene containing ultra-high-molecular-weight polyethylene and the lower molecular weight polyethylene is called a polyethylene composition. The amount of the ultra-high-molecular-weight polyethylene in the polyethylene composition is 7% or less by mass, preferably 5% or less by mass based on the mass of the polyethylene composition. When the amount of the ultra-high-molecular-weight polyethylene exceeds 7% by mass, the microporous polyolefin membrane will typically not contain the desired hybrid structure.

(ii) Molecular Weight Distribution Mw/Mn

Mw/Mn is a measure of a molecular weight distribution; the larger this value, the wider the molecular weight distribution. Though not restricted, the Mw/Mn of the polyethylene resin is preferably 5-300, more preferably 5 to 100, most preferably 5 to 30. When the Mw/Mn is less than 5, the percentage of a high-molecular-weight component is too high to conduct melt extrusion easily. On the other hand, when the Mw/Mn is more than 300, the percentage of a low-molecular-weight component is too high, resulting in decrease in the strength of the microporous membrane. The Mw/Mn of polyethylene (homopolymer or an ethylene•α-olefin copolymer) can be properly controlled by a multi-stage polymerization. The multi-stage polymerization method is preferably a two-stage polymerization method comprising forming a high-molecular-weight polymer component in the first stage, and forming a low-molecular-weight polymer component in the second stage. In the case of the polyethylene composition, the larger the Mw/Mn, the larger difference in Mw exists between the ultra-high-molecular-weight polyethylene and the lower molecular weight polyethylene, and vice versa. The Mw/Mn of the polyethylene composition can be properly controlled by the molecular weights and mixing ratios of components.

(b) Polypropylene Resin

In an embodiment, the polyethylene (or polyethylene composition) in the form of a resin is combined with polypropylene resin. The polypropylene in the polypropylene resin can be a propylene homopolymer or a copolymer of propylene and a fourth olefin, though the homopolymer is preferable. The copolymer may be a random or block copolymer. The fourth olefin, which is an olefin other than propylene, includes α-olefins such as ethylene, butene-1, pentene-1, hexene-1,4-methylpentene-1, octene-1, vinyl acetate, methyl methacrylate, styrene, etc., and diolefins such as butadiene, 1,5-hexadiene, 1,7-octadiene, 1,9-decadiene, etc. The percentage of the fourth olefin in the propylene copolymer is preferably in a range not deteriorating the properties of the microporous polyolefin membrane such as heat resistance, compression resistance, heat shrinkage resistance, etc., and is preferably less than 10% by mol.

The Mw of the polypropylene is preferably $1\times10^4$ to $4\times10^6$, more preferably $3\times10^5$ to $3\times10^6$. The molecular weight distribution (Mw/Mn) of polypropylene is preferably 1.01-100, more preferably 1.1-50.

The amount of polypropylene in the polyolefin composition is 25% or less by mass based on 100% of the mass ("100% by mass") of the polyolefin composition. When the percentage of polypropylene is more than 25% by mass, the resultant microporous membrane has relatively poor electrolytic solution absorption characteristics. The percentage of polypropylene is preferably 15% or less by mass, more preferably 10% or less by mass, per 100% by mass of the polyolefin composition.

(2) Other Components

In addition to the above components, the polyolefin composition can contain (a) additional polyolefin and/or (b) heat-resistant polymer resins having melting points or glass transition temperatures (Tg) of 170° C. or higher, in amounts not deteriorating the properties of the microporous membrane, for example 10% or less by mass based on the polyolefin composition.

(a) Additional Polyolefins

The additional polyolefin can be at least one of (a) polybutene-1, polypentene-1, poly-4-methylpentene-1, polyhexene-1, polyoctene-1, polyvinyl acetate, polymethyl methacrylate, polystyrene and an ethylene·α-olefin copolymer, each of which may have Mw of $1\times10^4$ to $4\times10^6$, and (b) a polyethylene wax having Mw of $1\times10^3$ to $1\times10^4$. Polybutene-1, polypentene-1, poly-4-methylpentene-1, polyhexene-1, polyoctene-1, polyvinyl acetate, polymethyl methacrylate and polystyrene are not restricted to homopolymers, but may be copolymers containing still other α-olefins.

(b) Heat-Resistant Resins

The heat-resistant resins are preferably (i) crystalline resins having melting points of 170° C. or higher, which may be partially crystalline, and (b) completely amorphous resins having Tg of 170° C. or higher and mixtures thereof. The melting point and Tg are determined by differential scanning calorimetry (DSC) according to JIS K7121. Specific examples of the heat-resistant resins include polyesters such as polybutylene terephthalate (melting point: about 160-230° C.), polyethylene terephthalate (melting point: about 250-270° C.), etc., fluororesins, polyamides (melting point: 215-265° C.), polyarylene sulfide, polyimides (Tg: 280° C. or higher), polyamideimides (Tg: 280° C.), polyether sulfone (Tg: 223° C.), polyetheretherketone (melting point: 334° C.), polycarbonates (melting point: 220-240° C.), cellulose acetate (melting point: 220° C.), cellulose triacetate (melting point: 300° C.), polysulfone (Tg: 190° C.), polyetherimide (melting point: 216° C.), etc.

(c) Content

The total amount of the additional polyolefin and the heat-resistant resin is preferably 20% or less by mass per 100% by mass of the polyolefin composition.

[2] Production Method of Microporous Polyolefin Membrane

In an embodiment, the invention relates to a method for producing the microporous polyolefin membrane comprising the steps of (1) melt-blending a polyolefin composition and a membrane-forming solvent to form a polyolefin solution, (2) extruding the polyolefin solution through a die to form an extrudate, (3) cooling the extrudate to form a gel-like sheet, (4) stretching the gel-like sheet to form a stretched gel-like sheet, (5) removing the membrane-forming solvent from the stretched gel-like sheet to form a solvent-removed membrane, (6) stretching the solvent-removed membrane to form a stretched membrane, and (7) heat-setting the stretched membrane to form the microporous polyolefin membrane. A heat-setting treatment step (8), a heat roller treatment step (9), and/or a hot solvent treatment step (10) may be conducted between the steps (4) and (5), if desired. A heat-setting treatment step (11) may be conducted between the steps (5) and (6). A step (12) of cross-linking with ionizing radiations, a hydrophilizing treatment step (13), a surface-coating treatment step (14), etc., may be conducted after the step (7), if desired.

(1) Preparation of the Polyolefin Solution

The polyolefin composition is melt-blended with at least one membrane-forming solvent to prepare a polyolefin solution. The polyolefin solution may contain various additives such as anti-oxidants, fine silicate powder (pore-forming material), etc., in ranges not deteriorating the effects of the present invention, if desired.

To enable stretching at relatively higher magnifications, the membrane-forming solvent is preferably liquid at room temperature. The liquid solvents can be, for example, aliphatic, alicyclic or aromatic hydrocarbons such as nonane, decane, decalin, p-xylene, undecane, dodecane, liquid paraffin, mineral oil distillates having boiling points comparable to those of the above hydrocarbons, and phthalates liquid at room temperature such as dibutyl phthalate, dioctyl phthalate, etc. To obtain a gel-like sheet having a stable solvent content, it is preferable to use a non-volatile liquid solvent such as liquid paraffin. In an embodiment, one or more solid solvents which are miscible with the polyolefin composition during melt-blending but solid at room temperature, may be added to the liquid solvent. Such solid solvents are preferably stearyl alcohol, ceryl alcohol, paraffin waxes, etc. In another embodiment, solid solvent can be used without liquid solvent. However, when only the solid solvent is used, uneven stretching, etc., can occur.

The viscosity of the liquid solvent is preferably 30-500 cSt, more preferably 30-200 cSt, when measured at a temperature of 25° C. When the viscosity at 25° C. is less than 30 cSt, the polyolefin solution may foam, resulting in difficulty in blending. On the other hand, when the viscosity is more than 500 cSt, the removal of the liquid solvent can be difficult.

Though not particularly critical, the uniform melt-blending of the polyolefin solution is preferably conducted in a double-screw extruder to prepare a high-concentration polyolefin solution. The membrane-forming solvent may be added before starting melt-blending, or supplied to the double-screw extruder in an intermediate portion during blending, though the latter is preferable.

The melt-blending temperature of the polyolefin solution is preferably in a range of the melting point ("Tm") of the polyethylene resin +10° C. to (Tm +120° C.). The melting point can be measured by differential scanning calorimetry (DSC) according to JIS K7121. In an embodiment, the melt-blending temperature is 140 to 250° C., more preferably 170 to 240° C., particularly where the polyethylene resin has a melting point of about 130 to 140° C.

To obtain a good hybrid structure, the concentration of the polyolefin composition in the polyolefin solution is preferably 25-50% by mass, more preferably 25 to 45% by mass, based on the mass of the polyolefin solution.

A ratio L/D of the screw length L to the screw diameter D in the double-screw extruder is preferably in a range of 20 to 100, more preferably in a range of 35 to 70. When L/D is less than 20, melt-blending can be insufficient. When L/D is more than 100, the residence time of the polyolefin solution in the double-screw extruder can be too long. In this case, the membrane's molecular weight deteriorates as a result of excessive sharing and heating, which is undesirable. The cylinder of the double-screw extruder preferably has an inner diameter of 40 to 100 mm.

In the double-screw extruder, a ratio (Q/Ns) of the amount Q (kg/h) of the polyolefin solution charged to the number of revolution Ns (rpm) of a screw is preferably 0.1 to 0.55 kg/h/rpm. When Q/Ns is less than 0.1 kg/h/rpm, the polyolefin can be damaged by shearing, resulting in decrease in strength and meltdown temperature. When Q/Ns is more than 0.55 kg/h/rpm, uniform blending cannot be achieved. Q/Ns is more preferably 0.2 to 0.5 kg/h/rpm. The number of revolution Ns of a screw is preferably 180 rpm or more. Though not particularly critical, the upper limit of the number of revolution Ns of a screw is preferably 500 rpm.

(2) Extrusion

The polyolefin solution can be melt-blended in the extruder and extruded from a die. In another embodiment, the polyolefin can be extruded and then pelletized. In this embodiment, the pellets can be melt-blended and extruded in a second extrusion to make the gel-like sheet. In either embodiment, the die may be a sheet-forming die having a rectangular orifice, a double-cylindrical, hollow die, an inflation die, etc. In the case of the sheet-forming die, a die gap is preferably 0.1 to 5 mm. The extrusion temperature is preferably 140 to 250° C., and the extruding speed is preferably 0.2 to 15 m/minute.

(3) Formation of Gel-Like Sheet

The polyolefin solution extruded from the die is cooled to form a gel-like sheet. Cooling is preferably conducted at least to a gelation temperature at a cooling rate of 50° C./minute or more. Cooling is preferably conducted to 25° C. or lower. Such cooling sets the micro-phase of the polyolefin separated by the membrane-forming solvent. Generally, the slower cooling rate provides the gel-like sheet with larger pseudo-cell units, resulting in a coarser higher-order structure. On the other hand, a higher cooling rate results in denser cell units. A cooling rate of less than 50° C./minute can lead to increased crystallinity, making it more difficult to provide the gel-like sheet with suitable stretchability. Usable cooling methods include bringing the extrudate into contact with a cooling medium such as cooling air, cooling water, etc.; bringing the extrudate into contact with cooling rollers; etc.

(4) Stretching of Gel-Like Sheet

The gel-like sheet is then stretched in at least one direction. While not wishing to be bound by any theory or model, it is believed that the gel-like sheet can be uniformly stretched because the sheet contains the membrane-forming solvent. The gel-like sheet is preferably stretched to a predetermined magnification after heating, by, e.g., a tenter method, a roller method, an inflation method or a combination thereof. The stretching may be conducted monoaxially or biaxially, though the biaxial stretching is preferable. In the case of biaxial stretching, any of simultaneous biaxial stretching, sequential stretching or multi-stage stretching (for instance, a combination of the simultaneous biaxial stretching and the sequential stretching) may be used, though the simultaneous biaxial stretching is preferable.

The stretching magnification is preferably 2 fold or more, more preferably 3 to 30 fold in the case of monoaxial stretching. In the case of biaxial stretching, the stretching magnification is preferably 3 fold or more in any direction, namely 9 fold or more, more preferably 16 fold or more, most preferably 25 fold or more, in area magnification. With the area magnification of 9 fold or more, the pin puncture strength of the microporous membrane is improved. When the area magnification is more than 400 fold, stretching apparatuses, stretching operations, etc., involve large-sized stretching apparatuses, which can be difficult to operate.

To obtain a good hybrid structure, the stretching temperature is preferably in a range of the crystal dispersion temperature ("Tcd") of the polyethylene resin to Tcd +25° C., more preferably in a range of Tcd +10° C. to Tcd +25° C., most preferably in a range of Tcd +15° C. to Tcd +25° C. When the stretching temperature is lower than Tcd, it is believed that the polyethylene resin is so insufficiently softened that the gel-like sheet is easily broken by stretching, failing to achieve high-magnification stretching.

The crystal dispersion temperature is determined by measuring the temperature characteristics of dynamic viscoelasticity according to ASTM D 4065. Because the polyethylene resin has a crystal dispersion temperature of about 90-100° C., the stretching temperature is 90 to 125° C., preferably 100 to 125° C., more preferably 105 to 125° C.

The above stretching causes cleavage between polyethylene lamellas, making the polyethylene phases finer and forming large numbers of fibrils. The fibrils form a three-dimensional network structure. The stretching is believed to improve the mechanical strength of the microporous membrane and expands its pores, making the microporous membrane suitable for battery separators.

Depending on the desired properties, stretching may be conducted with a temperature distribution in a thickness direction, to provide the microporous membrane with further improved mechanical strength. The detailed description of this method is given by Japanese Patent 3347854.

(5) Removal of the Membrane-Forming Solvent

For the purpose of removing (washing away or displacing, or dissolving) the membrane-forming solvent, a washing solvent is used. Because the polyolefin composition phase is phase-separated from a membrane-forming solvent phase, the removal of the liquid solvent provides a microporous membrane. The removal of the liquid solvent can be conducted by using one or more suitable washing solvents, i.e., one capable of displacing the liquid solvent from the membrane. Examples of the washing solvents include volatile solvents, e.g., saturated hydrocarbons such as pentane, hexane, heptane, etc., chlorinated hydrocarbons such as methylene chloride, carbon tetrachloride, etc., ethers such as diethyl ether, dioxane, etc., ketones such as methyl ethyl ketone, etc., linear fluorocarbons such as trifluoroethane, $C_6F_{14}$, etc., cyclic hydrofluorocarbons such as $C_5H_3F_7$, etc., hydrofluoroethers such as $C_4F_9OCH_3$, $C_4F_9OC_2H_5$, etc., perfluoroethers such as $C_4F_9OCF_3$, $C_4F_9OC_2F_5$, etc., and mixtures thereof.

The washing of the stretched membrane can be conducted by immersion in the washing solvent and/or the showering of the washing solvent. The washing solvent used is preferably 300 to 30,000 parts by mass per 100 parts by mass of the stretched membrane. The washing temperature is usually 15 to 30° C., and if desired, heating may be conducted during washing. The heating temperature during washing is preferably 80° C. or lower. Washing is preferably conducted until the amount of the remaining liquid solvent becomes less than 1% by mass of the amount of liquid solvent that was present in polyolefin solution prior to extrusion.

The microporous membrane deprived of the membrane-forming solvent can be dried by a heat-drying method, a wind-drying (e.g., air drying using moving air) method, etc. Any drying method capable of removing a significant amount of the washing solvent can be used. The drying temperature is preferably equal to or lower than Tcd, more preferably 5° C. or more lower than Tcd. Drying is conducted until the remaining washing solvent becomes preferably 5% or less by mass, more preferably 3% or less by mass, per 100% by mass (on a dry basis) of the microporous membrane. Particularly, substantially all of the washing solvent is removed during drying. Insufficient drying undesirably can lead to decrease in the porosity of the microporous membrane by the subsequent heat treatment, resulting in poor permeability.

(6) Stretching of Microporous Membrane

The dried microporous membrane is stretched (re-stretched) at least monoaxially. The re-stretching of the microporous membrane can be conducted, for example, while heating, by a tenter method, etc., as in the first stretching step. The re-stretching may be monoaxial or biaxial. In the case of biaxial stretching, any one of simultaneous biaxial stretching or sequential stretching may be used, though the simultaneous biaxial stretching is preferable. Incidentally, because the re-stretching is usually conducted on the microporous membrane in a long sheet form, which is obtained from the stretched gel-like sheet, the directions of MD and TD (where MD means "machine direction", i.e., the direction of membrane travel during processing, and TD means "transverse direction", i.e., a direction orthogonal to both the MD and the horizontal surface of the membrane) in the re-stretching is the same as those in the stretching of the gel-like sheet.

The second stretching or re-stretching is conducted at a second temperature preferably equal to Tm or lower, more preferably in a range of Tcd to Tm. When the second stretching temperature is higher than Tm, it is believed that a melt viscosity is generally too low to conduct good stretching, resulting in low permeability. When the second stretching temperature is lower than Tcd, it is believed that the polyolefin is insufficiently softened so that the membrane might be broken by stretching, i.e., a failure to achieve uniform stretching. In an embodiment, the second stretching temperature is usually 90-135° C., preferably 95-130° C.

The monoaxial stretching magnification of the microporous membrane is preferably 1.1 to 1.8 fold. A magnification of 1.1 to 1.8 fold generally provides the microporous membrane with a hybrid structure having a large average pore size. In the case of monoaxial stretching, the magnification can be 1.1 to 1.8 fold in a longitudinal or transverse direction. In the case of biaxial stretching, the microporous membrane may be stretched at the same or different magnifications, though preferably the same, as long as the stretching magnifications in both directions are within 1.1 to 1.8 fold.

When the stretching magnification of the microporous membrane is less than 1.1 fold, it is believed that the hybrid structure is not formed, resulting in poor permeability, electrolytic solution absorption and compression resistance in the membrane. When the stretching magnification is more than 1.8 fold, too fine fibrils are formed, and it is believed that the heat shrinkage resistance and the electrolytic solution absorption characteristics of the membrane are reduced. This stretching magnification is more preferably 1.2 to 1.6 fold.

The stretching rate is preferably 3%/second or more in a stretching direction. In the case of monoaxial stretching, stretching rate is 3%/second or more in a longitudinal or transverse direction. In the case of biaxial stretching, stretching rate is 3%/second or more in both longitudinal and transverse directions. A stretching rate of less than 3%/second decreases the membrane's permeability, and provides the microporous membrane with large unevenness in properties (particularly, air permeability) in a width direction when stretched in a transverse direction. The stretching rate is preferably 5%/second or more, more preferably 10%/second or more. Though not particularly critical, the upper limit of the stretching rate is preferably 50%/second to prevent rupture of the membrane.

(7) Heat Treatment

The dried microporous membrane is thermally treated (heat-set) to stabilize crystals and make uniform lamellas in the membrane. The heat-setting is preferably conducted by a tenter method or a roller method. The heat-setting temperature is preferably in a range of the stretching temperature of the microporous membrane (second stretching temperature) ±5° C., more preferably in a range of the stretching temperature of the microporous membrane ±3° C. It is believed that too low a heat-setting temperature deteriorates the membrane's pin puncture strength, tensile rupture strength, tensile rupture elongation and heat shrinkage resistance, while too high a heat-setting temperature deteriorates membrane permeability.

An annealing treatment can be conducted after the heat-setting step. The annealing is a heat treatment with no load applied to the microporous membrane, and may be conducted by using, e.g., a heating chamber with a belt conveyer or an air-floating-type heating chamber. The annealing may also be conducted continuously after the heat-setting with the tenter slackened. The annealing temperature is preferably Tm or lower, more preferably in a range from 60° C. to (Tm −5° C.). Annealing is believed to provide the microporous membrane with high permeability and strength.

(8) Heat-Setting Treatment of Stretched Gel-Like Sheet

The stretched gel-like sheet between the steps (4) and (5) may be heat-set, provided this heat setting does not deteriorate the properties of the microporous membrane. The heat-setting method may be conducted the same way as described above for step (7). The heat-setting temperature is preferably in a range of the stretching temperature of the gel-like sheet ±5° C., more preferably in a range of the stretching temperature of the gel-like sheet ±3° C.

(9) Heat Roller Treatment

At least one surface of the stretched gel-like sheet and/or the microporous membrane may be brought into contact with a heat rollers following any of steps (4) to (7). The roller temperature is preferably in a range of (Tcd +10° C.) to Tm. The contact time of the heat roller with the stretched gel-like sheet is preferably 0.5 seconds to 1 minute. The heat roller may have a flat or rough surface. The heat roller may have a suction functionality to remove the membrane-forming solvent or the washing solvent. Though not particularly critical, one example of a roller-heating system may comprise holding a heated oil in contact with a roller surface.

(10) Hot Solvent Treatment

The stretched gel-like sheet may be contacted with a hot solvent between steps (4) and (5). A hot solvent treatment turns fibrils formed by stretching to a leave vein "leaf-vein" form with relatively thick fiber trunks, providing the microporous membrane with large pore size and suitable strength and permeability. The term "leaf vein form" means that the fibrils have thick fiber trunks, and thin fibers extending in a complicated network structure from the trunks. The details of the hot solvent treatment method are described in WO 2000/20493.

(11) Heat-Setting of Microporous Membrane Containing Washing Solvent

The microporous membrane containing a washing solvent between the steps (5) and (6) may be heat-set to a degree that does not deteriorate the properties of the microporous membrane. The heat-setting method may be the same as described above in step (8).

(12) Cross-Linking

The heat-set microporous membrane may be cross-linked by ionizing radiation rays such as α-rays, β-rays, γ-rays, electron beams, etc. In the case of irradiating electron beams, the amount of electron beams is preferably 0.1-100 Mrad, and the accelerating voltage is preferably 100-300 kV. The cross-linking treatment elevates the meltdown temperature of the microporous membrane.

(13) Hydrophilizing Treatment

The heat-set microporous membrane may be subjected to a hydrophilizing treatment (a treatment that makes the membrane more hydrophilic). The hydrophilizing treatment may be a monomer-grafting treatment, a surfactant treatment, a corona-discharging treatment, etc. The monomer-grafting treatment is preferably conducted after the cross-linking treatment.

In the case of the surfactant treatment, any of nonionic surfactants, cationic surfactants, anionic surfactants and amphoteric surfactants may be used, and the nonionic surfactants are preferred. The microporous membrane can be dipped in a solution of the surfactant in water or a lower alcohol such as methanol, ethanol, isopropyl alcohol, etc., or coated with the solution by a doctor blade method.

(14) Surface-Coating Treatment

While not required, the heat-set microporous membrane resulting from step (7) can be coated with porous polypropylene, porous fluororesins such as polyvinylidene fluoride and polytetrafluoroethylene, porous polyimides, porous polyphenylene sulfide, etc., to improve meltdown properties when the membrane is used as battery separators. The polypropylene used for the coating preferably has Mw of 5,000-500,000, and a solubility of 0.5 g or more in 100 g of toluene at 25° C. Such polypropylene more preferably has a racemic diade fraction of 0.12-0.88, the racemic diade being a structural unit in which two adjacent monomer units are mirror-image isomers to each other. The surface-coating layer may be applied, for instance, by applying a solution of the above coating resin in a good solvent to the microporous membrane, removing part of the good solvent to increase a resin concentration, thereby forming a structure in which a resin phase and a good solvent phase are separated, and removing the remainder of the good solvent. Examples of the good solvents include aromatic compounds, such as toluene, xylene.

[3] Structure and Properties of Microporous Polyolefin Membrane (1) Structure

Figure 1:
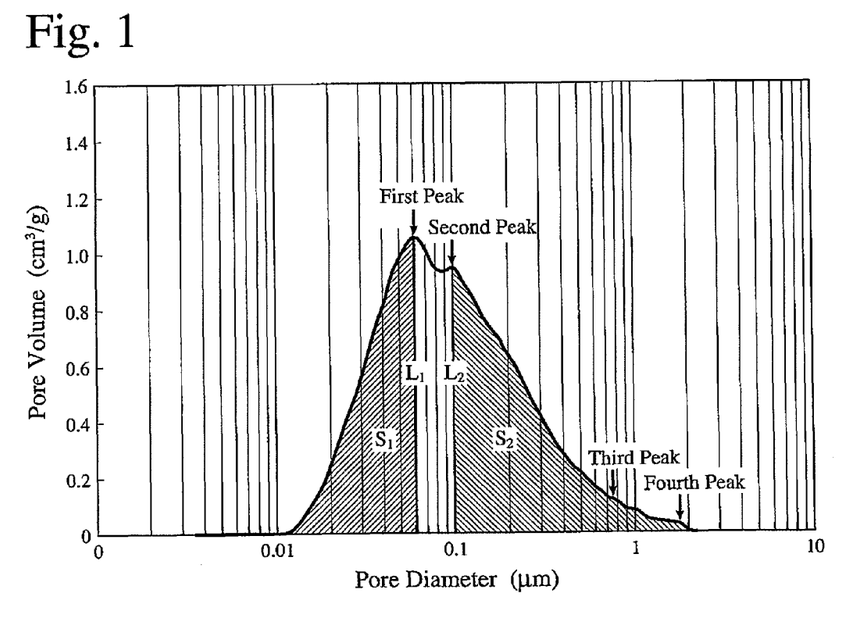
FIG. 1 is a graph showing a typical pore size distribution curve.

The microporous polyolefin membrane has a hybrid structure derived from the polyethylene resin, in which its pore size distribution curve obtained by mercury intrusion porosimetry has at least two peaks (main peak and at least one sub-peak), as shown in FIG. 1. As used herein, the term "pore size" is analogous to the pore diameter in the case where the pores are approximately spherical. The main peak and sub-peak respectively correspond to the dense domains and coarse domains of the polyethylene resin phase. When the percentage of the ultra-high-molecular-weight polyethylene in the membrane is more than 7% by mass based on the polyethylene resin in the membrane, the desired hybrid structure is more difficult to form, resulting in poor electrolytic solution absorption characteristics.

In a preferred embodiment of the microporous polyolefin membrane, the main peak is in a pore size range of 0.01-0.08 µm, and at least one sub-peak is in a pore size ranging from more than 0.08 µm to 1.5 µm. In other words, at least one sub-peak has a pore size of greater than 0.08 µm to 1.5 µm or less. More preferably, the main peak is a first peak in a pore size range of about 0.04 to 0.07 µm, and the sub-peaks comprise a second peak in a pore size range of about 0.1 to 0.11 µm, a third peak at a pore size of about 0.7 µm, and a fourth peak in a pore size range of about 1 to 1.1 µm. However, the sub-peaks need not have the third and fourth peaks. In the measured example shown in FIG. 1, the pore size distribution curve has first to fourth peaks at about 0.06 µm, about 0.1 µm, about 0.7 µm, and about 1.1 µm, respectively.

The pore volume ratio of the dense domains to the coarse domains is determined by $S_1$ and $S_2$ shown in FIG. 1. A hatched area $S_1$ on the smaller diameter side than a vertical line $L_1$ passing the first peak corresponds to the pore volume of the dense domains, and a hatched area $S_2$ on the larger diameter side than a vertical line $L_2$ passing the second peak corresponds to the pore volume of the coarse domains. The pore volume ratio $S_1/S_2$ of the dense domains to the coarse domains is preferably 0.5 to 49, more preferably 0.6 to 10, most preferably 0.7 to 2.

Though not critical, dense domains and coarse domains are irregularly entangled to form a hybrid structure in any cross sections of the microporous polyolefin membrane viewed in longitudinal and transverse directions. The hybrid structure can be observed by a transmission electron microscope (TEM), etc.

Because the microporous polyolefin membrane has relatively large internal space and openings due to coarse domains, it has suitable permeability and electrolytic solution absorption, with little air permeability variation when compressed. Accordingly, lithium ion batteries such as lithium ion secondary batteries comprising separators formed by such microporous polyolefin membrane have suitable productivity and cyclability.

(2) Properties

In preferred embodiments, the microporous polyolefin membranes have the following properties.

(a) Air Permeability of 20 to 400 Seconds/100 cm³ (Converted to the Value at 20-μm Thickness)

When the membrane's air permeability measured according to JIS P8117 is 20 to 400 seconds/100 cm³, batteries with separators formed by the microporous membrane have suitably large capacity and good cyclability. When the air permeability is less than 20 seconds/100 cm³, shutdown does not sufficiently occur because pores are so large that they cannot fully close when the temperatures inside the batteries are elevated at 140 degree C. and more. Air permeability $P_1$ measured on a microporous membrane having a thickness $T_1$ according to JIS P8117 is converted to air permeability $P_2$ at a thickness of 20 μm by the equation of $P_2=(P_1 \times 20)/T_1$.

(b) Porosity of 25-80%

When the porosity is less than 25%, the microporous membrane is not believed to have good air permeability. When the porosity exceeds 80%, battery separators formed by the microporous membrane are believed to have insufficient strength, which can result in the short-circuiting of battery's electrodes.

(c) Pin Puncture Strength of 2,000 mN or More (Converted to the Value at 20-μm Thickness)

The membrane's pin puncture strength (converted to the value at membrane thickness of 20-μm) is represented by the maximum load measured when the microporous membrane is pricked with a needle of 1 mm in diameter with a spherical end surface (radius R of curvature: 0.5 mm) at a speed of 2 mm/second. When the pin puncture strength is less than 2,000 mN/20 μm, short-circuiting might occur in batteries with separators formed by the microporous membrane.

(d) Tensile Rupture Strength of 49,000 kPa or More

A tensile rupture strength of 49,000 kPa or more in both longitudinal and transverse directions (measured according to ASTM D-882), is characteristic of suitable durable microporous membranes, particularly when used as a battery separator. The tensile rupture strength is preferably 80,000 kPa or more.

(e) Tensile Rupture Elongation of 100% or More

A tensile rupture elongation of 100% or more in both longitudinal and transverse directions (measured according to ASTM D-882), is characteristic of suitably durable microporous membranes, particularly when used as a battery separator.

(f) Heat Shrinkage Ratio of 12% or Less

When the heat shrinkage ratio after exposed to 105° C. for 8 hours exceeds 12% in both longitudinal and transverse directions, heat generated in batteries with the microporous membrane separators can cause the shrinkage of the separators, making it more likely that short-circuiting occurs on the edges of the separators.

(g) Thickness Variation Ratio of 20% or Less after Heat Compression

The thickness variation ratio after heat compression at 90° C. under pressure of 2.2 MPa for 5 minutes is generally 20% or less, per 100% of the thickness before compression. Batteries comprising microporous membrane separators with a thickness variation ratio of 20% or less have suitably large capacity and good cyclability.

(h) Air Permeability of 700 Sec/100 cm³ or Less after Heat Compression (Converted to the Value at 20-μm Thickness)

The microporous polyolefin membrane when heat-compressed under the above conditions generally has air permeability (Gurley value) of 700 sec/100 cm³/20 μm or less. Batteries using such membranes have suitably large capacity and cyclability. The air permeability is preferably 650 sec/100 cm³/20 μm or less.

(i) Surface Roughness of 3×10² nm or More

The surface roughness of the membrane measured by an atomic force microscope (AFM) in a dynamic force mode is generally $3 \times 10^2$ nm or more (measured as the maximum height difference). The membrane's surface roughness is preferably $3.5 \times 10^2$ nm or more. In an embodiment, the upper limit on the surface roughness is $3 \times 10^3$ nm.

[4] Battery Separator

In an embodiment, the battery separator formed from any of the above microporous polyolefin membranes has a thickness of 3 to 200 μm, or 5 to 50 μm, or 10 to 35 μm, though the most suitable thickness properly selectable depending on the type of battery manufactured.

[5] Battery

Though not particularly critical, the microporous polyolefin membranes may be used as separators for primary and secondary batteries, particularly such as lithium ion secondary batteries, lithium-polymer secondary batteries, nickel-hydrogen secondary batteries, nickel-cadmium secondary batteries, nickel-zinc secondary batteries, silver-zinc secondary batteries, particularly for lithium ion secondary batteries The lithium ion secondary battery comprises a cathode and an anode laminated via a separator, and the separator contains an electrolyte, ic usually in the form of an electrolytic solution ("electrolyte"). The electrode structure is not critical; conventional structures are suitable.may have a known structure, not particularly restricted. The electrode structure may be, for instance, a coin type in which a disc-shaped positive and anodes are opposing, a laminate type in which planar positive and anodes are alternately laminated, a toroidal type in which ribbon-shaped positive and anodes are wound, etc.

The cathode usually comprises a current collector, and a cathodic active material layer capable of absorbing and discharging lithium ions, which is formed on the current collector. The cathodic active materials may be inorganic compounds such as transition metal oxides, composite oxides of lithium and transition metals (lithium composite oxides), transition metal sulfides, etc. The transition metals may be V, Mn, Fe, Co, Ni, etc. Preferred examples of the lithium composite oxides are lithium nickelate, lithium cobaltate, lithium manganate, laminar lithium composite oxides based on α-NaFeO$_2$, etc. The anode comprises a current collector, and a negative-electrode active material layer formed on the current collector. The negative-electrode active materials may be carbonaceous materials such as natural graphite, artificial graphite, cokes, carbon black, etc.

The electrolyteic solution can be a solution obtained by dissolving a lithium salt in an organic solvent. The lithium salts may be LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. The lithium salts may be used alone or in combination. The organic solvents may be organic solvents having high boiling points and high dielectric constants such as ethylene carbonate, propylene carbonate, ethylmethyl carbonate, γ-butyrolactone, etc.; and/or organic solvents having low boiling points and low viscosity such as tetrahydrofuran, 2-methyltetrahydrofuran, dimethoxyethane, dioxolane, dimethyl carbonate, dimethyl carbonate, etc. These organic solvents may be used alone or in combination. Because the organic solvents having high dielectric constants generally have high viscosity, while those having low viscosity generally have low dielectric constants, their mixtures are preferably used.

When the battery is assembled, the separator is impregnated with the electrolytic solution, so that the separator (microporous polyolefin membrane) is provided with ion permeability. The impregnation treatment is usually conducted by immersing the microporous membrane in the electrolytic solution at room temperature. When a cylindrical battery is assembled, for instance, a cathode sheet, a microporous membrane separator and an anode sheet are laminated in this order, and the resultant laminate is wound to a toroidal-type electrode assembly. The resultant electrode assembly is charged formed into a battery can and then impregnated with the above electrolytic solution, and a battery lid acting as a cathode terminal provided with a safety valve is caulked to the battery can via a gasket to produce a battery.

The present invention will be explained in more detail referring to Examples below without intention of restricting the scope of the present invention.

EXAMPLE 1

Dry-blended were 100 parts by mass of (i) a polyethylene (PE) composition comprising 5% by mass of ultra-high-molecular-weight polyethylene (UHMWPE) having a weight-average molecular weight (Mw) of $1.5 \times 10^6$ and a molecular weight distribution (Mw/Mn) of 8, and (ii) 95% by mass of high-density polyethylene (HDPE) having Mw of $3.0 \times 10^5$ and Mw/Mn of 8.6, and 0.2 parts by mass of tetrakis [methylene-3-(3,5-ditertiary-butyl-4-hydroxyphenyl)-propionate] methane as an antioxidant. The polyethylene in the mixture had a melting point of 135° C., a crystal dispersion temperature of 100° C., and Mw/Mn of 10.0.

The Mw and Mw/Mn of each UHMWPE and HDPE were measured by a gel permeation chromatography (GPC) method under the following conditions.
Measurement apparatus: GPC-15° C. available from Waters Corporation,
Column: Shodex UT806M available from Showa Denko K.K.,
Column temperature: 135° C.,
Solvent (mobile phase): o-dichlorobenzene,
Solvent flow rate: 1.0 ml/minute,
Sample concentration: 0.1% by weight (dissolved at 135° C. for 1 hour),
Injected amount: 500 μl,
Detector: Differential Refractometer available from Waters Corp., and
Calibration curve: Produced from a calibration curve of a single-dispersion, standard polystyrene sample using a predetermined conversion constant.

40 parts by mass of the resultant mixture was charged into a strong-blending double-screw extruder having an inner diameter of 58 mm and L/D of 42, and 60 parts by mass of liquid paraffin [50 cst (40° C.)] was supplied to the double-screw extruder via a side feeder. Melt-blending was conducted at 210° C. and 200 rpm to prepare a polyethylene solution. This polyethylene solution was extruded from a T-die mounted to the double-screw extruder. The extrudate was cooled while passing through cooling rollers controlled at 40° C., to form a gel-like sheet.

Using a tenter-stretching machine, the gel-like sheet was simultaneously biaxially stretched at 118.5° C. to 5 fold in both longitudinal and transverse directions. The stretched gel-like sheet was fixed to an aluminum frame of 20 cm×20 cm, immersed in a bath of methylene chloride controlled at 25° C. to remove the liquid paraffin with vibration of 100 rpm for 3 minutes, and dried by an air flow at room temperature. The dried membrane was re-stretched by a batch-stretching machine to a magnification of 1.5 fold in a transverse direction at 129° C. The re-stretched membrane, which remained fixed to the batch-stretching machine, was heat-set at 129° C. for 30 seconds to produce a microporous polyethylene membrane.

EXAMPLE 2

A microporous polyethylene membrane was produced in the same manner as in Example 1, except that a polyethylene having a melting point of 135° C., a crystal dispersion temperature of 100° C. and Mw/Mn of 10.0, which comprised 2% by mass of UHMWPE having Mw of $2.0 \times 10^6$ and Mw/Mn of 8, and 98% by mass of HDPE having Mw of $2.5 \times 10^5$ and Mw/Mn of 8.9, was used. Also, the stretching temperature of the gel-like sheet was 119° C., the stretching magnification of the microporous membrane was 1.4 fold, and the stretching and heat-setting temperatures of the microporous membrane were both 129.5° C.

EXAMPLE 3

A microporous polyethylene membrane was produced in the same manner as in Example 1, except that polyethylene having a melting point of 135° C., a crystal dispersion temperature of 100° C., and Mw/Mn of 10.0, which comprised 2% by mass of UHMWPE having Mw of $2.0 \times 10^6$ and Mw/Mn of 8, and 98% by mass of HDPE having Mw of $3.0 \times 10^5$ and Mw/Mn of 8.6, was used. Also, the stretching magnification of the microporous membrane was 1.4 fold, and the stretching and heat-setting temperatures of the microporous membrane were both 126° C.

EXAMPLE 4

A microporous polyethylene membrane was produced in the same manner as in Example 1, except that a polyethylene having a melting point of 135° C., a crystal dispersion temperature of 100° C., and Mw/Mn of 10.5, which comprised 3% by mass of UHMWPE having Mw of $2.0 \times 10^6$ and Mw/Mn of 8, and 97% by mass of HDPE having Mw of $3.0 \times 10^5$ and Mw/Mn of 8.6, was used. Also, the stretching temperature of the gel-like sheet was 117° C., the stretched gel-like sheet was heat-set at 122° C. for 10 seconds, and the stretching and heat-setting temperatures of the microporous membrane were both 130° C.

EXAMPLE 5

A microporous polyethylene membrane was produced in the same manner as in Example 1, except that only HDPE having Mw of $3.0 \times 10^5$, Mw/Mn of 8.6, a melting point of 135° C. and a crystal dispersion temperature of 100° C. was used as a polyolefin, that the stretching temperature of the gel-like sheet was 118° C., and that the stretching magnification of the microporous membrane was 1.4 fold.

EXAMPLE 6

A microporous polyethylene membrane was produced in the same manner as in Example 1, except that the same polyethylene as in Example 4 was used. Also, the concentration of the polyethylene in the polyethylene solution was 30% by mass based on the mass of the polyethylene solution. Also, the stretching temperature of the gel-like sheet was 118° C., and the stretching magnification of the microporous membrane was 1.4 fold.

EXAMPLE 7

A microporous polyolefin membrane was produced in the same manner as in Example 1, except that a polyolefin composition was used comprising 3% by mass of UHMWPE having Mw of $2.0 \times 10^6$ and Mw/Mn of 8, 92% by mass of HDPE having Mw of $3.0 \times 10^5$ and Mw/Mn of 8.6, and 5% by mass of a propylene homopolymer (PP) having Mw of $5.3 \times 10^5$. The polyethylene had a melting point of 135° C., a crystal dispersion temperature of 100° C., and Mw/Mn of 10.5. The concentration of the polyolefin composition in the polyolefin solution was 35% by mass based on the mass of the polyolefin solution, the stretching temperature of the gel-like sheet was 116° C., the stretching magnification of the microporous membrane was 1.4 fold, and that the stretching and heat-setting temperatures of the microporous membrane were both 127° C. The Mw of PP was measured by a GPC method as above.

COMPARATIVE EXAMPLE 1

A microporous polyethylene membrane was produced in the same manner as in Example 1, except that polyethylene having a melting point of 135° C., a crystal dispersion temperature of 100° C., and Mw/Mn of 14.4, which comprised 20% by mass of UHMWPE having Mw of $2.0 \times 10^6$ and Mw/Mn of 8, and 80% by mass of HDPE having Mw of $3.5 \times 10^5$ and Mw/Mn of 8.6, was used. The concentration of the polyethylene in the polyethylene solution was 30% by mass, the stretching temperature of the gel-like sheet was 115° C., the microporous membrane containing a washing solvent was heat-set at 126.8° C. for 10 seconds, and the microporous membrane was not stretched and heat-set.

COMPARATIVE EXAMPLE 2

A microporous polyethylene membrane was produced in the same manner as in Example 1, except that polyethylene having a melting point of 135° C., a crystal dispersion temperature of 100° C., and Mw/Mn of 10.0, which comprised 2% by mass of UHMWPE having Mw of $2.0 \times 10^6$ and Mw/Mn of 8, and 98% by mass of HDPE having Mw of $3.5 \times 10^5$ and Mw/Mn of 8.6, was used. Also, the concentration of the polyethylene solution was 30% by mass, the stretching temperature of the gel-like sheet was 118° C., and the microporous membrane was heat-set at 128° C. for 10 seconds without being stretched.

COMPARATIVE EXAMPLE 3

A microporous polyethylene membrane was produced in the same manner as in Example 1, except that polyethylene having a melting point of 135° C., a crystal dispersion temperature of 100° C., and Mw/Mn of 10.5, which comprised 3% by mass of UHMWPE having Mw of $2.0 \times 10^6$ and Mw/Mn of 8, and 97% by mass of HDPE having Mw of $3.5 \times 10^5$ and Mw/Mn of 8.6, was used. Also, the concentration of the polyethylene solution was 30% by mass, the stretching temperature of the gel-like sheet was 115° C., microporous membrane was stretched to 2.0 fold at 130° C., and the heat-setting temperature was 126° C.

COMPARATIVE EXAMPLE 4

A microporous polyethylene membrane was produced in the same manner as in Example 1, except that the same polyethylene as in Comparative Example 1 was used. Also, the concentration of the polyethylene solution was 30% by mass, the stretching temperature of the gel-like sheet was 118° C., microporous membrane was stretched to 1.4 fold at 130° C., and the heat-setting temperature was 130° C.

COMPARATIVE EXAMPLE 5

A gel-like sheet was formed in the same manner as in Example 1, except for using polyethylene having a melting point of 135° C., a crystal dispersion temperature of 100° C., and Mw/Mn of 10.1, which comprised 2% by mass of UHMWPE having Mw of $2.0 \times 10^6$ and Mw/Mn of 8, and 98% by mass of HDPE having Mw of $2.0 \times 10^5$ and Mw/Mn of 8.9. When this gel-like sheet was stretched to 5 fold simultaneously in both longitudinal and transverse directions at 128° C., it was ruptured.

COMPARATIVE EXAMPLE 6

A microporous polyethylene membrane was produced in the same manner as in Example 1, except that the same polyethylene as in Comparative Example 5 was used. Also, the stretching temperature of the gel-like sheet was 119° C., the microporous membrane was stretched to 1.4 fold at 129.5° C., and the heat-setting temperature was 120° C.

COMPARATIVE EXAMPLE 7

A microporous polyethylene membrane was produced in the same manner as in Example 1, except that the same polyethylene as in Example 2 was used. Also, the stretching temperature of the gel-like sheet was 119° C., the microporous membrane was stretched to 1.4 fold at 115° C., and the heat-setting temperature was 134° C.

Figure 2:
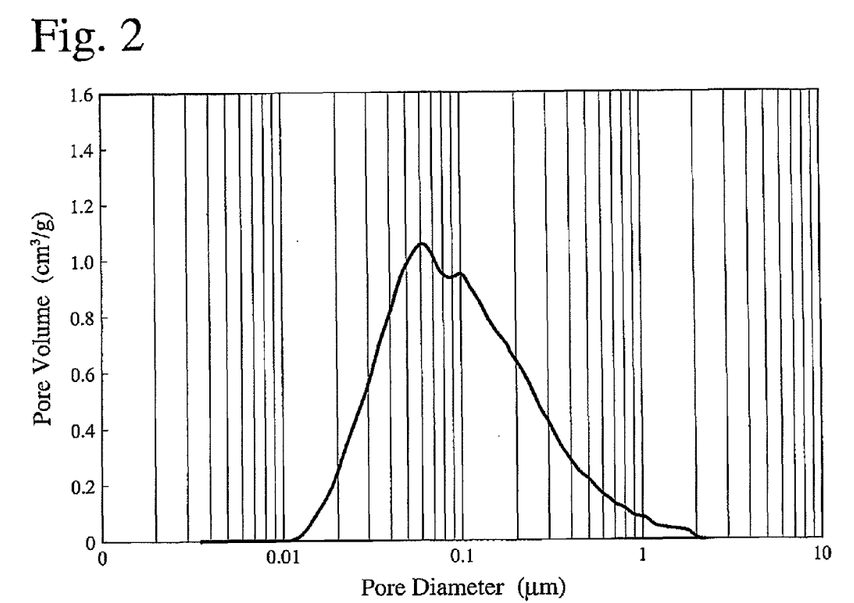
FIG. 2 is a graph showing the pore size distribution curve of the microporous membrane of Example 3.
Figure 3:
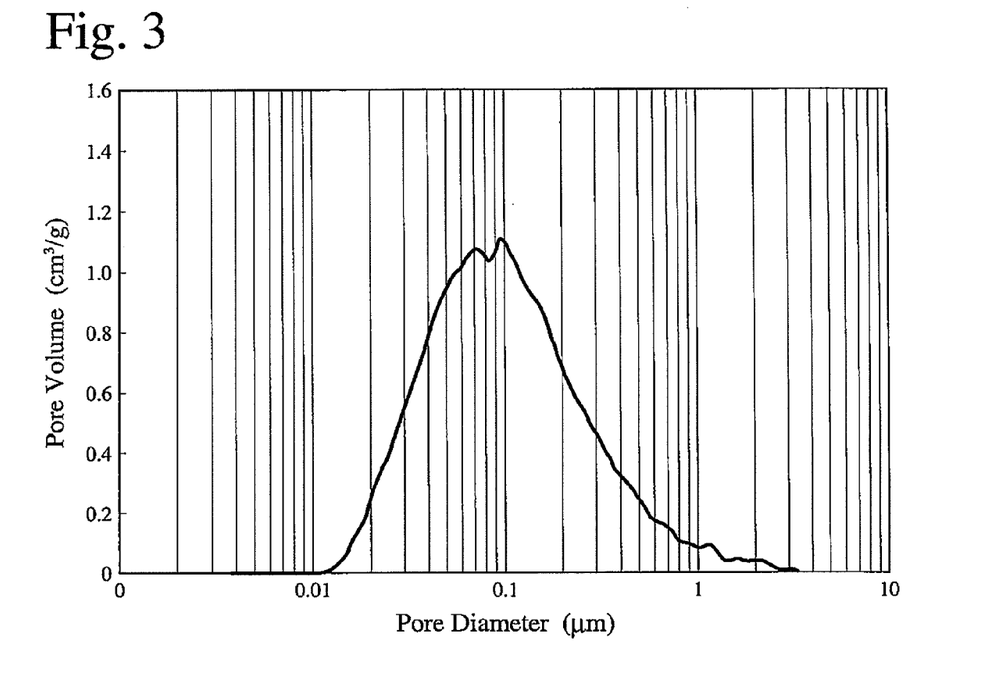
FIG. 3 is a graph showing the pore size distribution curve of the microporous membrane of Example 7.
Figure 4:
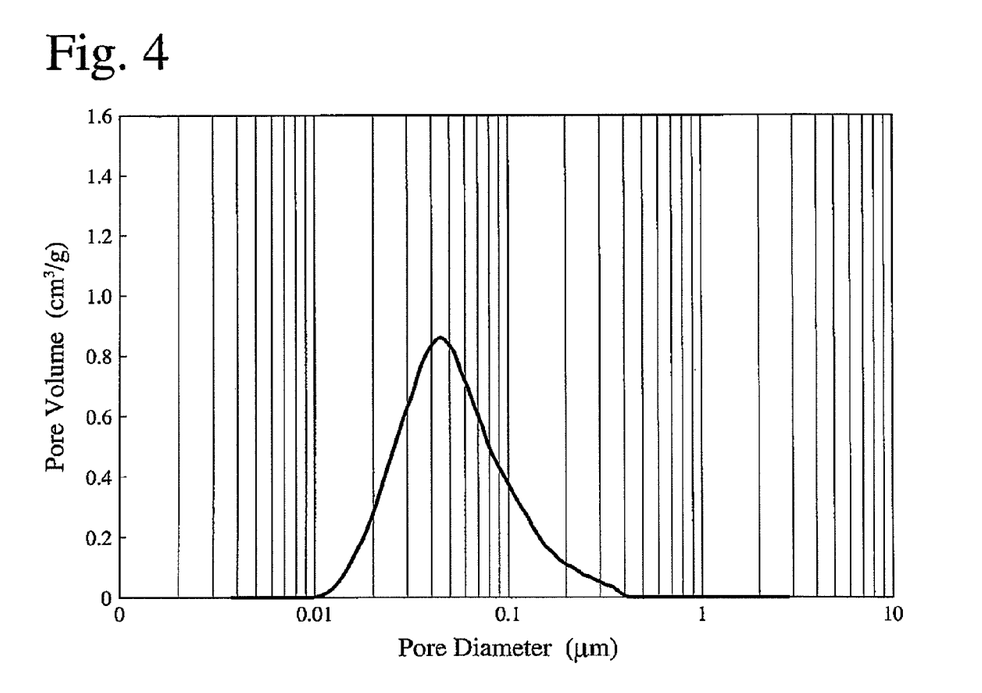
FIG. 4 is a graph showing the pore size distribution curve of the microporous membrane of Comparative Example 1.

The properties of the microporous membranes obtained in Examples 1-7 and Comparative Examples 1-7 were measured by the following methods. The results are shown in Table 1. With respect to the microporous membranes of Examples 3 and 7, and Comparative Example 1, their pore size distribution curves obtained by mercury intrusion porosimetry are shown in FIGS. 2-4.

(1) Average Thickness (μm)

The thickness of each microporous membrane was measured by a contact thickness meter at 5-cm longitudinal intervals over the width of 30 cm, and averaged.

(2) Air Permeability (sec/100 cm³/20 μm)

Air permeability $P_1$ measured on each microporous membrane having a thickness $T_1$ according to JIS P8117 was converted to air permeability $P_2$ at a thickness of 20 μm by the equation of $P_2=(P_1 \times 20)/T_1$.

(3) Porosity (%)

Measured by a weight method.

(4) Pin Puncture Strength (mN/20 μm)

The maximum load was measured, when each microporous membrane having a thickness of $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the equation of $L_2=(L_1 \times 20)/T_1$, and used as pin puncture strength.

(5) Tensile Rupture Strength and Tensile Rupture Elongation

They were measured on a 10-mm-wide rectangular test piece according to ASTM D882.

(6) Heat Shrinkage Ratio (%)

The shrinkage ratios of each microporous membrane in both longitudinal and transverse directions were measured three times when exposed to 105° C. for 8 hours, and averaged to determine the heat shrinkage ratio.

(7) Thickness Variation Ratio after Heat Compression (%)

A microporous membrane sample was situated between a pair of highly flat plates, and heat-compressed by a press machine under a pressure of 2.2 MPa (22 kgf/cm²) at 90° C. for 5 minutes, to determine an average thickness in the same manner as above. A thickness variation ratio was calculated by the formula of (average thickness after compression−average thickness before compression)/(average thickness before compression)×100.

(8) Air Permeability after Heat Compression (sec/100 cm³/20 μm)

Each microporous membrane having a thickness of $T_1$ was heat-compressed under the above conditions, and measured with respect to air permeability $P_1$ according to JIS P8117. The measured air permeability $P_1$ was converted to air permeability $P_2$ at a thickness of 20 μm by the equation of $P_2=(P_1 \times 20)/T_1$.

(9) Electrolytic Solution Absorption Speed

Using a dynamic-surface-tension-measuring apparatus (DCAT21 with high-precision electronic balance, available from Eko Instruments Co., Ltd.), a microporous membrane sample was immersed in an electrolytic solution (electrolyte: 1 mol/L of $LiPF_6$, solvent: ethylene carbonate/dimethyl carbonate at a volume ratio of 3/7) kept at 18° C., to determine an electrolytic solution absorption speed by the formula of [weight increment (g) of microporous membrane/weight (g) of microporous membrane before absorption]. The electrolytic solution absorption speed is expressed by a relative value, assuming that the electrolytic solution absorption rate in the microporous membrane of Comparative Example 1 is 1.

(10) Pore Size Distribution

The pore size distribution of the microporous membrane was determined by mercury intrusion porosimetry. Pore diameter distribution of MPF is measured by a device "Poresizer Type 9320, manufactured by Micromeritics Ltd."

(11) Pore Volume Ratio

Calculated from $S_1/S_2$ shown in FIG. 1.

(12) Surface Roughness

The maximum height difference of a surface measured by AFM in a dynamic force mode (DFM) was used as surface roughness.

TABLE 1

| | No. | | |
|---|---|---|---|
| | Example 1 | Example 2 | Example 3 |
| Polyolefin | | | |
| UHMWPE Mw[1]/MWD[2]/% by mass | $1.5 \times 10^6$/8/5 | $2.0 \times 10^6$/8/2 | $2.0 \times 10^6$/8/2 |
| HDPE Mw/MWD/% by mass | $3.0 \times 10^5$/8.6/95 | $2.5 \times 10^5$/8.9/98 | $3.0 \times 10^5$/8.6/98 |
| PP Mw/% by mass | —/— | —/— | —/— |
| PE (Composition) Tm(° C.)[3]/Tcd (° C.)[4]/MWD | 135/100/10.0 | 135/100/10.0 | 135/100/10.0 |
| Production Conditions | | | |
| Polyolefin Concentration (% by mass) | 40 | 40 | 40 |
| Stretching of Gel-Like Sheet | | | |
| Temperature (° C.) | 118.5 | 119 | 118.5 |
| Magnification (MD × TD) | 5 × 5 | 5 × 5 | 5 × 5 |
| Heat-Setting of Stretched Gel-Like Sheet Temperature (° C.)/Time (second) | —/— | —/— | —/— |
| Heat-Setting of Microporous Membrane Containing Washing Solvent Temperature (° C.)/Time (second) | —/— | —/— | —/— |
| Stretching of Microporous Membrane Temp. (° C.)/Direction/Magnification (folds) | 129/TD/1.5 | 129.5/TD/1.4 | 126/TD/1.4 |
| Heat-Setting of Microporous Membrane Temperature (° C.)/Time (second) | 129/30 | 129.5/30 | 126/30 |
| Properties of Microporous Membrane | | | |
| Average Thickness (μm) | 20.1 | 20.4 | 19.9 |
| Air Permeability (sec/100 cm³/20 μm) | 245 | 221 | 123 |
| Porosity (%) | 41.1 | 40.6 | 48.5 |
| Pin Puncture Strength (mN/20 μm) | 4,802 | 4,733.4 | 4,263 |

TABLE 1-continued

| | | | |
|---|---|---|---|
| Tensile Rupture Strength (kPa) | | | |
| MD | 112,700 | 113,860 | 98,000 |
| TD | 148,960 | 152,880 | 133,770 |
| Tensile Rupture Elongation (%) | | | |
| MD | 165 | 160 | 165 |
| TD | 125 | 110 | 120 |
| Heat Shrinkage Ratio (%) | | | |
| MD | 1.9 | 2.5 | 5.5 |
| TD | 2.5 | 2.8 | 5.6 |
| Higher-Order Structure | | | |
| First Peak (μm) | 0.05 | 0.04 | 0.06 |
| Second Peak (μm) | 0.1 | 0.1 | 0.1 |
| Third Peak (μm) | 0.7 | 0.7 | 0.7 |
| Fourth Peak (μm) | 1 | 1 | 1.1 |
| Pore Volume Ratio | 1.10 | 1.36 | 0.76 |
| Surface Roughness[5] (nm) | $5.8 \times 10^2$ | $4.4 \times 10^2$ | $6.1 \times 10^2$ |
| Electrolytic Solution Absorption Speed | 3.9 | 3.8 | 4.1 |
| Thickness Variation Ratio After Heat Compression (%) | −15 | −11 | −19 |
| Air Permeability After Heat Compression (sec/100 cm³/20 μm) | 542 | 545 | 465 |

| | No. | | |
|---|---|---|---|
| | Example 4 | Example 5 | Example 6 |
| Polyolefin | | | |
| UHMWPE Mw[1]/MWD[2]/% by mass | $2.0 \times 10^6$/8/3 | —/—/— | $2.0 \times 10^6$/8/3 |
| HDPE Mw/MWD/% by mass | $3.0 \times 10^5$/8.6/97 | $3.0 \times 10^5$/8.6/100 | $3.0 \times 10^5$/8.6/97 |
| PP Mw/% by mass | —/— | —/— | —/— |
| PE (Composition) Tm(° C.)[3]/Tcd (° C.)[4]/MWD | 135/100/10.5 | 135/100/8.6 | 135/100/10.5 |
| Production Conditions | | | |
| Polyolefin Concentration (% by mass) | 40 | 40 | 30 |
| Stretching of Gel-Like Sheet | | | |
| Temperature (° C.) | 117 | 118 | 118 |
| Magnification (MD × TD) | 5 × 5 | 5 × 5 | 5 × 5 |
| Heat-Setting of Stretched Gel-Like Sheet Temperature (° C.)/Time (second) | 122/10 | —/— | —/— |
| Heat-Setting of Microporous Membrane Containing Washing Solvent Temperature (° C.)/Time (second) | —/— | —/— | —/— |
| Stretching of Microporous Membrane Temp. (° C.)/Direction/Magnification (folds) | 130/TD/1.5 | 129/TD/1.4 | 129/TD/1.4 |
| Heat-Setting of Microporous Membrane Temperature (° C.)/Time (second) | 130/30 | 129/30 | 129/30 |
| Properties of Microporous Membrane | | | |
| Average Thickness (μm) | 20.4 | 20.2 | 19.5 |
| Air Permeability (sec/100 cm³/20 μm) | 245 | 220 | 205 |
| Porosity (%) | 40.2 | 41 | 41.5 |
| Pin Puncture Strength (mN/20 μm) | 4,214 | 4,998 | 3,920 |
| Tensile Rupture Strength (kPa) | | | |
| MD | 117,110 | 118,090 | 106,820 |
| TD | 139,160 | 157,780 | 133,280 |
| Tensile Rupture Elongation (%) | | | |
| MD | 170 | 155 | 180 |
| TD | 115 | 100 | 140 |
| Heat Shrinkage Ratio (%) | | | |
| MD | 2.0 | 3.1 | 2.0 |
| TD | 2.6 | 3.6 | 2.6 |
| Higher-Order Structure | | | |
| First Peak (μm) | 0.05 | 0.07 | 0.05 |
| Second Peak (μm) | 0.1 | 0.11 | 0.1 |
| Third Peak (μm) | 0.7 | 0.7 | 0.7 |
| Fourth Peak (μm) | 1 | 1 | 1 |
| Pore Volume Ratio | 0.80 | 1.40 | 1.25 |
| Surface Roughness[5] (nm) | $5.3 \times 10^2$ | $6.2 \times 10^2$ | $5.5 \times 10^2$ |
| Electrolytic Solution Absorption Speed | 4 | 4.2 | 4.1 |

TABLE 1-continued

| | | | |
|---|---|---|---|
| Thickness Variation Ratio After Heat Compression (%) | −16 | −10 | −18 |
| Air Permeability After Heat Compression (sec/100 cm$^3$/20 μm) | 495 | 515 | 532 |

| | No. | | |
|---|---|---|---|
| | Example 7 | Comp. Ex. 1 | Comp. Ex. 2 |

Polyolefin

| | Example 7 | Comp. Ex. 1 | Comp. Ex. 2 |
|---|---|---|---|
| UHMWPE Mw$^{(1)}$/MWD$^{(2)}$/% by mass | 2.0 × 10$^6$/8/3 | 2.0 × 10$^6$/8/20 | 2.0 × 10$^6$/8/2 |
| HDPE Mw/MWD/% by mass | 3.0 × 10$^5$/8.6/92 | 3.5 × 10$^5$/8.6/80 | 3.5 × 10$^5$/8.6/98 |
| PP Mw/% by mass | 5.3 × 10$^5$/5 | —/— | —/— |
| PE (Composition) Tm(° C.)$^{(3)}$/Tcd (° C.)$^{(4)}$/MWD | 135/100/10.5 | 135/100/14.4 | 135/100/10.0 |

Production Conditions

| | Example 7 | Comp. Ex. 1 | Comp. Ex. 2 |
|---|---|---|---|
| Polyolefin Concentration (% by mass) | 35 | 30 | 30 |

Stretching of Gel-Like Sheet

| | Example 7 | Comp. Ex. 1 | Comp. Ex. 2 |
|---|---|---|---|
| Temperature (° C.) | 116 | 115 | 118 |
| Magnification (MD × TD) | 5 × 5 | 5 × 5 | 5 × 5 |
| Heat-Setting of Stretched Gel-Like Sheet Temperature (° C.)/Time (second) | —/— | —/— | —/— |
| Heat-Setting of Microporous Membrane Containing Washing Solvent Temperature (° C.)/Time (second) | —/— | 126.8/10 | —/— |
| Stretching of Microporous Membrane Temp. (° C.)/Direction/Magnification (folds) | 127/TD/1.4 | —/—/— | —/—/— |
| Heat-Setting of Microporous Membrane Temperature (° C.)/Time (second) | 127/30 | —/— | 128/10 |

Properties of Microporous Membrane

| | Example 7 | Comp. Ex. 1 | Comp. Ex. 2 |
|---|---|---|---|
| Average Thickness (μm) | 20.5 | 20.1 | 20.8 |
| Air Permeability (sec/100 cm$^3$/20 μm) | 180 | 425 | 181 |
| Porosity (%) | 45.2 | 38 | 41 |
| Pin Puncture Strength (mN/20 μm) | 4,165 | 4,900 | 2,891 |

Tensile Rupture Strength (kPa)

| | Example 7 | Comp. Ex. 1 | Comp. Ex. 2 |
|---|---|---|---|
| MD | 113,680 | 148,960 | 90,160 |
| TD | 125,440 | 124,460 | 77,420 |

Tensile Rupture Elongation (%)

| | Example 7 | Comp. Ex. 1 | Comp. Ex. 2 |
|---|---|---|---|
| MD | 190 | 145 | 160 |
| TD | 175 | 220 | 280 |

Heat Shrinkage Ratio (%)

| | Example 7 | Comp. Ex. 1 | Comp. Ex. 2 |
|---|---|---|---|
| MD | 2.5 | 5.0 | 3.0 |
| TD | 2.2 | 4.5 | 3.2 |

Higher-Order Structure

| | Example 7 | Comp. Ex. 1 | Comp. Ex. 2 |
|---|---|---|---|
| First Peak (μm) | 0.06 | 0.04 | 0.05 |
| Second Peak (μm) | 0.1 | — | — |
| Third Peak (μm) | — | — | — |
| Fourth Peak (μm) | — | — | — |
| Pore Volume Ratio | 0.73 | — | — |
| Surface Roughness$^{(5)}$ (nm) | 6.4 × 10$^2$ | 2.1 × 10$^2$ | 1.9 × 10$^2$ |
| Electrolytic Solution Absorption Speed | 4.1 | 1 | 1.5 |
| Thickness Variation Ratio After Heat Compression (%) | −17 | −20 | −22 |
| Air Permeability After Heat Compression (sec/100 cm$^3$/20 μm) | 485 | 962 | 720 |

| | No. | | |
|---|---|---|---|
| | Comp. Ex. 3 | Comp. Ex. 4 | Comp. Ex. 5 |

Polyolefin

| | Comp. Ex. 3 | Comp. Ex. 4 | Comp. Ex. 5 |
|---|---|---|---|
| UHMWPE Mw$^{(1)}$/MWD$^{(2)}$/% by mass | 2.0 × 10$^6$/8/3 | 2.0 × 10$^6$/8/20 | 2.0 × 10$^6$/8/2 |
| HDPE Mw/MWD/% by mass | 3.5 × 10$^5$/8.6/97 | 3.5 × 10$^5$/8.6/80 | 2.0 × 10$^5$/8.9/98 |
| PP Mw/% by mass | —/— | —/— | —/— |
| PE (Composition) Tm(° C.)$^{(3)}$/Tcd (° C.)$^{(4)}$/MWD | 135/100/10.5 | 135/100/14.4 | 135/100/10.1 |

Production Conditions

| | Comp. Ex. 3 | Comp. Ex. 4 | Comp. Ex. 5 |
|---|---|---|---|
| Polyolefin Concentration (% by mass) | 30 | 30 | 40 |

TABLE 1-continued

| Stretching of Gel-Like Sheet | | | |
|---|---|---|---|
| Temperature (° C.) | 115 | 118 | 128[6] |
| Magnification (MD × TD) | 5 × 5 | 5 × 5 | 5 × 5 |
| Heat-Setting of Stretched Gel-Like Sheet Temperature (° C.)/Time (second) | —/— | —/— | —/— |
| Heat-Setting of Microporous Membrane Containing Washing Solvent Temperature (° C.)/Time (second) | —/— | —/— | —/— |
| Stretching of Microporous Membrane Temp. (° C.)/Direction/Magnification (folds) | 130/TD/2.0 | 130/TD/1.4 | —/—/— |
| Heat-Setting of Microporous Membrane Temperature (° C.)/Time (second) | 126/30 | 130/30 | — |
| Properties of Microporous Membrane | | | |
| Average Thickness (μm) | 16.8 | 20.3 | — |
| Air Permeability (sec/100 cm³/20 μm) | 115 | 255 | — |
| Porosity (%) | 48.7 | 38.8 | — |
| Pin Puncture Strength (mN/20 μm) | 4,998 | 4,753 | — |
| Tensile Rupture Strength (kPa) | | | |
| MD | 99,960 | 119,560 | — |
| TD | 181,300 | 140,140 | — |
| Tensile Rupture Elongation (%) | | | |
| MD | 175 | 160 | —/— |
| TD | 90 | 110 | |
| Heat Shrinkage Ratio (%) | | | |
| MD | 2.8 | 1.5 | —/— |
| TD | 5.5 | 2.2 | |
| Higher-Order Structure | | | |
| First Peak (μm) | 0.1 | 0.05 | — |
| Second Peak (μm) | — | — | — |
| Third Peak (μm) | — | — | — |
| Fourth Peak (μm) | — | — | — |
| Pore Volume Ratio | — | — | — |
| Surface Roughness[5] (nm) | $1.8 \times 10^2$ | $2.5 \times 10^2$ | — |
| Electrolytic Solution Absorption Speed | 1.8 | 1.2 | — |
| Thickness Variation Ratio After Heat Compression (%) | −20 | −15 | — |
| Air Permeability After Heat Compression (sec/100 cm³/20 μm) | 485 | 688 | — |

| | No. | |
|---|---|---|
| | Comp. Ex. 6 | Comp. Ex. 7 |
| Polyolefin | | |
| UHMWPE Mw[1]/MWD[2]/% by mass | $2.0 \times 10^6$/8/2 | $2.0 \times 10^6$/8/2 |
| HDPE Mw/MWD/% by mass | $2.0 \times 10^5$/8.9/98 | $2.5 \times 10^5$/8.9/98 |
| PP Mw/% by mass | —/— | —/— |
| PE (Composition) Tm(° C.)[3]/Tcd (° C.)[4]/MWD | 135/100/10.1 | 135/100/10.0 |
| Production Conditions | | |
| Polyolefin Concentration (% by mass) | 40 | 40 |
| Stretching of Gel-Like Sheet | | |
| Temperature (° C.) | 119 | 119 |
| Magnification (MD × TD) | 5 × 5 | 5 × 5 |
| Heat-Setting of Stretched Gel-Like Sheet Temperature (° C.)/Time (second) | —/— | —/— |
| Heat-Setting of Microporous Membrane Containing Washing Solvent Temperature (° C.)/Time (second) | —/— | —/— |
| Stretching of Microporous Membrane Temp. (° C.)/Direction/Magnification (folds) | 129.5/TD/1.4 | 115/TD/1.4 |
| Heat-Setting of Microporous Membrane Temperature (° C.)/Time (second) | 120/30 | 134/30 |
| Properties of Microporous Membrane | | |
| Average Thickness (μm) | 20.4 | 20.4 |
| Air Permeability (sec/100 cm³/20 μm) | 60 | —[7] |
| Porosity (%) | 63 | — |
| Pin Puncture Strength (mN/20 μm) | 2,646 | — |

TABLE 1-continued

| Tensile Rupture Strength (kPa) | | |
|---|---|---|
| MD | 50,960 | — |
| TD | 79,772 | — |
| Tensile Rupture Elongation (%) | | |
| MD | 190 | —/— |
| TD | 135 | |
| Heat Shrinkage Ratio (%) | | |
| MD | 12 | —/— |
| TD | 11 | |
| Higher-Order Structure | | |
| First Peak (μm) | 0.1 | — |
| Second Peak (μm) | — | — |
| Third Peak (μm) | — | — |
| Fourth Peak (μm) | — | — |
| Pore Volume Ratio | — | — |
| Surface Roughness[5] (nm) | $6.4 \times 10^2$ | — |
| Electrolytic Solution Absorption Speed | 3.5 | — |
| Thickness Variation Ratio After Heat Compression (%) | −30 | — |
| Air Permeability After Heat Compression (sec/100 cm³/20 μm) | 450 | — |

Note:
[1] Mw represents a weight-average molecular weight.
[2] MWD represents a molecular weight distribution.
[3] Tm represents the melting point of the polyethylene (composition).
[4] Tcd represents the crystal dispersion temperature of the polyethylene (composition).
[5] Surface roughness (maximum height difference) measured by AFM in a dynamic force mode (DFM).
[6] The gel-like sheet was broken.
[7] The microporous membrane did not have air permeability.

As is clear from Table 1, in each microporous membrane of Examples 1-7 formed from a polyethylene composition containing 7% or less by mass of UHMWPE, or only HDPE, by stretching the microporous membrane to 1.1-1.8 fold, and then heat-setting the membrane at a temperature in a range of the stretching temperature of the microporous membrane ±5° C., the pore size distribution curve obtained by mercury intrusion porosimetry had a first peak at a pore size of 0.01-0.08 μm, and second to fourth peaks at pore sizes of more than 0.08 μm and 1.5 μm or less, and the surface roughness as a maximum height difference was $3 \times 10^2$ nm or more. As is clear from FIG. 2, in the microporous membrane of Example 3, the pore size distribution curve had a first peak at 0.06 μm, and second to fourth peaks at 0.1 μm, 0.7 μm, and 1.1 μm, respectively. It is clear from FIG. 3 that the pore size distribution curve of the microporous membrane of Example 7 has a first peak at 0.06 μm, and a second peak at 0.1 μm. It is thus clear that the microporous membranes of Examples 1-7 have suitable air permeability, pin puncture strength, tensile rupture strength, tensile rupture elongation and heat shrinkage resistance, as well as suitable electrolytic solution absorption, with little variation of thickness and air permeability after heat compression.

On the other hand, because the microporous membrane of Comparative Example 1 was obtained from a polyethylene composition containing more than 7% by mass of UHMWPE without stretching of the microporous membrane, its pore size distribution curve had only a first peak at 0.04 μm (FIG. 4), and exhibited an undesirably small surface roughness. Accordingly, the microporous membrane of the Comparative Example 1 did not perform as well as those of Examples 1-7 in air permeability, air permeability after heat compression, and electrolytic solution absorption.

Because the microporous membrane was not stretched in Comparative Example 2, the microporous membrane of Comparative Example 2 had only a first peak, exhibiting small surface roughness and a large thickness variation ratio after heat compression. Accordingly, it did not perform as well as those of Examples 1-7 in pin puncture strength, air permeability after heat compression and electrolytic solution absorption.

Because the stretching magnification of the microporous membrane was more than 1.8 fold in Comparative Example 3, and because a polyethylene composition containing more than 7% by mass of UHMWPE was used in Comparative Example 4, their pore size distribution curves had only a first peak, resulting in the microporous membranes with an undesirably small surface roughness. Accordingly, they did not perform as well as those of Examples 1-7 in electrolytic solution absorption.

In Comparative Example 5, the gel-like sheet was broken because of too high the first stretching temperature. Because the heat-setting temperature was lower than the stretching temperature of the microporous membrane −5° C. in Comparative Example 6, the microporous membrane of Comparative Example 6 did not perform as well as those of Examples 1-7 in pin puncture strength, tensile rupture strength, tensile rupture elongation and heat shrinkage resistance. The microporous membrane of Comparative Example 7 did not have a measurable air permeability, because the heat-setting temperature exceeded the stretching temperature of the microporous membrane +5° C.

Effect of the Invention

The microporous polyolefin membrane of the present invention has suitable permeability, mechanical strength, heat shrinkage resistance, compression resistance, and electrolytic solution absorption. Separators formed by the microporous polyolefin membrane of the present invention provide batteries with suitable safety, heat resistance, storage properties and productivity.

The invention claimed is:

1. A microporous polyolefin membrane, whose pore size distribution curve obtained by mercury intrusion porosimetry has at least two peaks, the polyolefin comprising (1) a polyethylene resin containing 7% or less by mass of ultra-high-molecular-weight polyethylene having a weight-average molecular weight of $1\times10^6$ or more, or (2) a mixture of 75% by mass or more of the polyethylene resin and 25% or less by mass of polypropylene wherein the membrane contains dense domains corresponding to a main peak in a range of 0.01 μm to 0.08 μm in the pore size distribution curve, and coarse domains corrsponding to at least one sub-peak in a range of more than 0.08 μm and 1.5 μm in the pore size distribution curve, and wherein the dense domains and the coarse domains are irregularly entangled.

2. The microporous polyolefin membrane according to claim 1, wherein the pore volume ratio of the dense domains to the coarse domains ranges from 0.5 to 49.

3. The microporous polyolefin membrane of claim 1 having surface roughness of $3\times10^2$ nm or more as a maximum height difference measured between any two points on the membrane.

4. The microporous polyolefin membrane of claim 1, wherein the polyethylene resin comprises (a) 7% or less by mass of the ultra-high-molecular-weight polyethylene and 93% by mass or more of polyethylene having a lower molecular weight than that of the ultra-high-molecular-weight polyethylene, or (b) only the polyethylene having a lower molecular weight.

5. The microporous polyolefin membrane of claim 4, wherein the polyethylene having a lower molecular weight is high-density polyethylene having a weight-average molecular weight of $1\times10^4$ to $5\times10^5$.

* * * * *